United States Patent
Zeilinger et al.

(10) Patent No.: US 11,056,742 B2
(45) Date of Patent: Jul. 6, 2021

(54) HOUSING PART OF A BATTERY CELL OR FOR A BATTERY CELL AND METHOD FOR APPLYING A RUPTURE ELEMENT TO A HOUSING PART OF A BATTERY CELL

(71) Applicant: Bayerische Motoren Werke Aktiengesellschaft, Munich (DE)

(72) Inventors: Tobias Zeilinger, Munich (DE); Ruediger Daub, Groebenzell (DE); Nikolaos Tsiouvaras, Munich (DE); Juergen Herold, Furth im Wald (DE); Christian Singer, Birkenfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 97 days.

(21) Appl. No.: 16/240,873

(22) Filed: Jan. 7, 2019

(65) Prior Publication Data
US 2019/0140223 A1 May 9, 2019

Related U.S. Application Data

(63) Continuation of application No. PCT/EP2017/065934, filed on Jun. 28, 2017.

(30) Foreign Application Priority Data

Jul. 8, 2016 (DE) .................. 10 2016 212 450.1

(51) Int. Cl.
| | |
|---|---|
| H01M 2/00 | (2006.01) |
| H01M 50/169 | (2021.01) |
| H01M 50/116 | (2021.01) |
| H01M 50/155 | (2021.01) |
| H01M 50/166 | (2021.01) |
| H01M 50/183 | (2021.01) |
| H01M 50/342 | (2021.01) |

(52) U.S. Cl.
CPC ....... *H01M 50/169* (2021.01); *H01M 50/116* (2021.01); *H01M 50/155* (2021.01); *H01M 50/166* (2021.01); *H01M 50/183* (2021.01); *H01M 50/342* (2021.01); *H01M 2220/20* (2013.01)

(58) Field of Classification Search
CPC ............ H01M 2/0478; H01M 2/0426; H01M 2/0277; H01M 2/0285; H01M 2/0434; H01M 2/0439; H01M 2/0482; H01M 2/0486; H01M 2/08; H01M 2/1235; H01M 2/1241; H01M 2220/30
See application file for complete search history.

(56) References Cited

U.S. PATENT DOCUMENTS

| | | |
|---|---|---|
| 2002/0187380 A1 | 12/2002 | Tanaka et al. |
| 2010/0032039 A1* | 2/2010 | Nemoto ............ H01M 8/04082 137/843 |
| 2011/0027645 A1* | 2/2011 | Komatsuki ............ H01M 2/08 429/185 |

FOREIGN PATENT DOCUMENTS

| | | |
|---|---|---|
| CN | 101933177 A | 12/2010 |
| DE | 102 24 962 B4 | 2/2003 |
| DE | 10 2010 013 027 A1 | 9/2011 |
| DE | 10 2011 078 301 A1 | 1/2013 |
| JP | 1-220368 A | 9/1989 |
| JP | 2007-220508 A | 8/2007 |
| WO | WO 2011/1168002 A1 | 9/2011 |

OTHER PUBLICATIONS

Dodiuk et al., "Preadhesion Laser Treatment of Aluminum Surfaces", The Journal of ADHE, Taylor & Francis Inc, Jan. 1, 1993, pp. 93-112, vol. 41, No. 1-4 Special, XP008152302, 20 pages total.
International Search Report (PCT/ISA/210) issued in PCT Application No. PCT/EP2017/065934 dated Aug. 25, 2017 with English translation (10 pages).
German-language Written Opinion (PCT/ISA/237) issued in PCT Application No. PCT/EP2017/065934 dated Aug. 25, 2017 (12 pages).
German Office Action issued in counterpart German Application No. 10 2016 212 450.1 dated Apr. 12, 2017 (six (6) pages).
English translation of Chinese Office Action issued in Chinese Application No. 201780025945.0 dated Dec. 14, 2020 (six (6) pages).

* cited by examiner

*Primary Examiner* — Raymond Alejandro
(74) *Attorney, Agent, or Firm* — Crowell & Moring LLP

(57) ABSTRACT

A method for applying a rupture element to a housing part of a battery cell, more particularly to a housing part provided for sealing a battery cell, includes the following steps: providing the housing part, wherein the housing part has an inner side facing the interior of the battery cell and an outer side facing the exterior of the battery cell. A hole is provided in the housing part, through which in the event of a malfunction, in which pressure in the battery cell reaches an inadmissably high level, pressure can escape into the surrounding area. A plate-shaped rupture element is provided, which is at least slightly larger than the hole. The plate-shaped rupture element is applied to the hole from the outer side such that it fully covers the hole and an edge region of the plate-shaped rupture element is joined all around to an edge region of the housing part, which extends around the hole, such that the plate-shaped rupture element fluidically seals the hole.

18 Claims, 1 Drawing Sheet

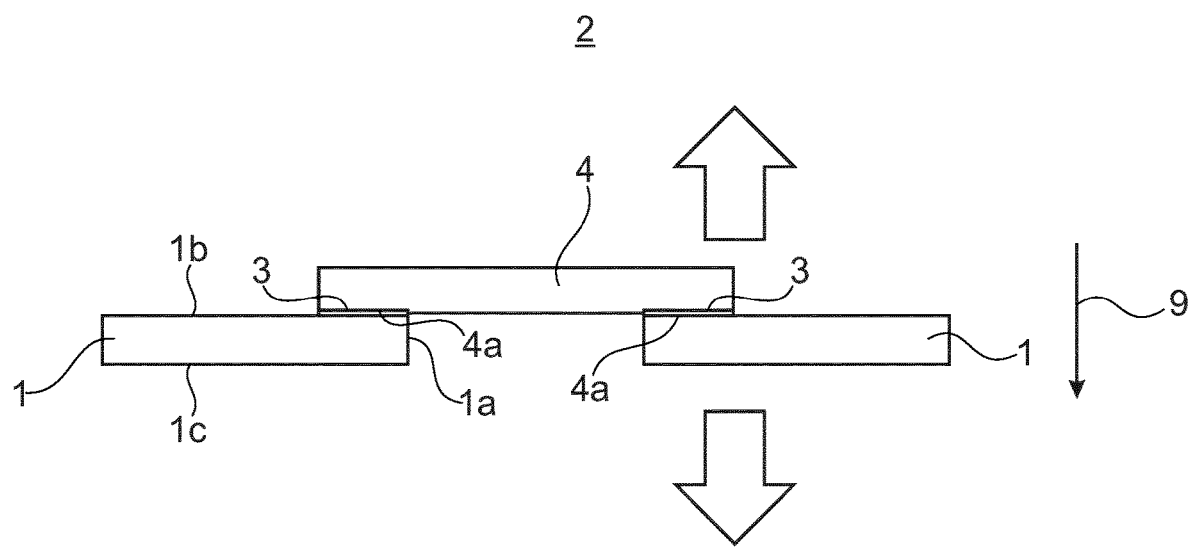

HOUSING PART OF A BATTERY CELL OR FOR A BATTERY CELL AND METHOD FOR APPLYING A RUPTURE ELEMENT TO A HOUSING PART OF A BATTERY CELL

CROSS REFERENCE TO RELATED APPLICATIONS

This application is a continuation of PCT International Application No. PCT/EP2017/065934, filed Jun. 28, 2017, which claims priority under 35 U.S.C. § 119 from German Patent Application No. 10 2016 212 450.1, filed Jul. 8, 2016, the entire disclosures of which are herein expressly incorporated by reference.

BACKGROUND AND SUMMARY OF THE INVENTION

The present invention relates to a housing part of or for a battery cell and to a method for applying a rupture element to a housing part of a battery cell.

High-voltage storage devices of electric vehicles or hybrid vehicles are usually composed of a plurality of storage modules which are connected electrically to one another. Each of the storage modules is in turn usually composed of a plurality of storage cells which are connected to one another electrically. The individual storage cells each have a housing which can have e.g. a cuboid shape or a cylinder shape.

During operation the storage cells can heat up considerably, which is usually also accompanied with a certain increase in pressure in the interior of the storage cells. Even if certain increases in pressure in the interior of the storage cells are tolerable, in the event of failures in the storage cell, unacceptably high increases in pressure can occur owing to chemical reactions occurring in said storage cell. When a predefined pressure in the storage cells is exceeded it is necessary to ensure that the pressure can be reduced in a "controlled" or "defined fashion".

In the case of commercially available storage cells, such as are installed e.g. in high-voltage accumulators of electric vehicles of the BMW brand, the battery cell housings are manufactured from aluminum. What is referred to as a "rupture diaphragm", which can also be composed of aluminum, is provided in a cover of the aluminum housing. Such rupture diaphragms are usually preformed or laser etched and welded onto the housing of the battery cell or to the cover of the battery cell using a costly micro-welding method. The terms "preformed" or "laser etched" mean that the rupture diaphragm is provided with one or more tear lines along which the rupture diaphragm tears when a predefined pressure is exceeded, and permits a reduction in pressure from the interior of the battery cells and into the surroundings.

Such rupture diaphragms are usually welded from a side facing the cell interior of the battery cell to the battery housing or to the battery cover.

The object of the invention is to provide a housing part of or for a battery cell in which a rupture element is secured in another, advantageous way to a housing part of the battery cell, and to provide a corresponding method for applying a rupture element to a housing part of a battery cell.

The starting point of the invention is a housing part of a battery cell or for a battery cell. The housing part can be, for example, a housing cover. The term "housing cover" can be understood to be, e.g., a part of the housing of a battery cell which is arranged on an upper side of the battery cell with respect to gravity or which forms an upper side or a part of the upper side of the battery cell.

The housing part according to the invention is composed e.g. of a metal material such as e.g. aluminum or an aluminum alloy.

The wall thickness of the housing part and/or of the battery cell housing can be e.g. in the range between 0.6 and 1 mm. The housing of the battery cell can have e.g. a cylindrical or prismatic, in particular a cuboid shape.

The abovementioned housing part has an inner side facing an interior of the battery cell and an outer side facing an exterior of the battery cell. A hole is provided in the housing part, via which hole, in the event of a malfunction in which an unacceptably high increase in pressure occurs in the interior of the battery cell, pressure can escape into the surroundings.

In a normal case, i.e. when the battery cell is in a satisfactory state and the pressure in the interior of the battery cell is lower than a predefined acceptable maximum pressure, the plate-shaped rupture element covers completely the hole which is provided in the housing part. In the "normal case", i.e. when the battery cell is in a satisfactory state, an edge region of the rupture element is connected all around to an edge region, extending around the hole, of the housing part, as a result of which the hole is closed off in a fluid-tight fashion by means of the rupture element.

A significant feature of an inventive housing part of a battery cell or for a battery cell is that the plate-shaped rupture element is at least slightly larger than the hole and is applied from the outer side of the housing part onto the hole. In contrast to the rupture diaphragm which is mentioned at the beginning and is provided with at least one material weakened portion, in the present invention there is provision that when a predefined battery cell internal pressure (pressure in the interior of the battery cell) is exceeded, a connection between the rupture element and the housing part fails or ruptures or tears, and the rupture element which is arranged on the outer side of the housing part and which covers the hole provided in the housing part becomes partially or completely detached from the housing part and permits a reduction in an internal pressure, prevailing in the interior of the battery cell, into the surroundings.

As already mentioned above, the housing part can be composed e.g. from metal, wherein the rupture element can be composed e.g. from a plastic material. As an alternative to this, there can also be provision that the housing part is composed of a plastic material, and the rupture element is composed of metal.

The subject matter of the invention is not only the housing part, described above, of a battery cell or for a battery cell, but also a method for applying a rupture element to such a housing part of a battery cell, in particular to a housing part which is provided for closing off a battery cell, such as e.g. a housing cover element of a battery cell. The housing part according to the invention can be composed of a metal material, such as e.g. aluminum or an aluminum alloy, and has an inner side facing an interior of the battery cell and an outer side facing an exterior of the battery cell. Provided in the housing part is a hole via which, in the event of a malfunction in which an unacceptably high increase in pressure occurs in the battery cell, pressure can escape into the surroundings.

A basic concept of the method according to the invention is that a plate-shaped rupture element is provided which is at least slightly larger than the hole provided in the housing part. The plate-shaped rupture element is therefore applied from an outer side onto the hole in such a way that it covers the hole completely. An edge region of the plate-shaped rupture element is connected all around to an edge region, extending around the hole, of the housing part in such a way that the plate-shaped rupture element closes off the hole in a fluid-tight, in particular gas-tight, fashion. Fluid-tight or gas-tight is to be understood in the sense of largely fluid-tight or largely gas-tight, wherein a leakage rate of up to $5*10^{-6}$ (mbar*1)/s is considered to be gas-tight.

According to one development of the invention, the connection of the edge region of the plate-shaped rupture element to the edge region, extending around the hole, of the housing part is carried out without adhesive, e.g. by means of mechanical adhesion. The term "mechanical adhesion" is understood to be form-fit anchoring (in the micrometer range or nanometer range) of an underside, facing the housing part, of the plate-shaped rupture element to an upper side, facing the rupture element, in the housing part. A form fit is produced (in the micrometer range or nanometer range) by engagement of the underside of the rupture element with the upper side of the housing part in a positively locking fashion in the region of capillaries, pores and/or undercuts. Mechanical anchoring of the rupture element to the housing part is based on the penetration of material of the rupture element into such capillaries, pores and/or undercuts, wherein the penetration occurs as a result of flowing of material of the rupture element during the joining of the rupture element, and "material" of the rupture element "which has flowed" after the joining of the rupture element, i.e. after it has flowed into surface structures of the housing part, i.e. into capillaries or pores or undercuts of the housing part, solidifies (again).

According to one development of the invention, a plate-shaped rupture element which is composed of a plastic material, such as e.g. of a polypropylene material, is used. The rupture element and the housing part to which the rupture element is secured can therefore have different materials, in particular a material combination of a metal (e.g. aluminum or an aluminum alloy from which the housing part is composed) and a non-metal, in particular a plastic material from which the rupture element is composed. It is important that the materials used for the housing part and the rupture element have a low permeability to water. Multi-layer material composites, such as e.g. a material composite with the layers of polypropylene-aluminum-polypropylene, for example in the manner of a film, are also possible as materials for the housing part and the rupture element.

In order to generate surface structures which are necessary for mechanical adhesion and/or positively locking connection of the underside of the rupture element to the upper side of the housing part (e.g. capillaries, pores, undercuts or the like) in the micrometer range or nanometer range, there may be provision that on an outer side of the housing part a surface of the edge region extending around the hole is processed by use of a laser, and as a result roughened, before the application of the rupture element.

As already mentioned, there may alternatively be provision that the housing part is composed of plastic and the rupture diaphragm is composed of metal. In this case, the rupture element, at least an edge region of the rupture element, would have to be roughened in a way analogous to the above description, wherein then during the pushing or pressing on of the rupture element, plastic material of the housing part would begin to flow and would flow into undercut regions of the surface structures of the rupture element. All the method steps mentioned in the description can (in the event of the housing part being composed of plastic and the rupture diaphragm of metal) therefore also be applied "the other way round", i.e. the materials of the housing part and of the rupture element which are mentioned in the description and the respective method steps can be interchanged with one another.

The surface structures which are necessary for a positively locking connection of the rupture element to the housing part are manufactured by way of laser processing or roughening (in the micrometer range or nanometer range). For example, groove-like structures and/or mushroom-head-like structures can be generated by laser processing. In particular oxide compounds of the material from which the housing part is composed (e.g. aluminum oxide structures in the case of aluminum) can be manufactured by laser processing the edge region of the hole. Trials have shown that oxide structures which are similar in their shape to the shape of mushroom heads can be manufactured by means of laser processing, and as a result of which it is possible to manufacture a multiplicity of undercut regions which permit a rupture platelet with a defined maximum strength or breaking strength to be secured well.

As an alternative to laser processing, the roughening can also be carried out by other suitable processing methods, such as for example by sandblasting.

According to one development of the invention, the edge region of the hole is processed in such a way that groove-like and/or mushroom-head-like structures or generally surface structures or rough portions are produced whose dimensions (e.g. roughness depth or distance between individual roughness peaks) are in the micrometer range, in the sub-micrometer range or in the nanometer range.

As already mentioned, when the rupture platelet is joined, material of the rupture platelet on the underside of the rupture platelet begins to flow and penetrates undercut regions of the surface structures which are manufactured by laser processing (e.g. groove-like and/or mushroom-head-like structures), as a result of which a form fit is formed between the rupture platelet and the housing part (in the micrometer range or nanometer range).

The joining of the plate-shaped rupture element is carried out by pushing or pressing on of the edge region of the plate-shaped rupture element onto the edge of the hole which is provided in the housing part.

Alternatively or additionally to the pushing or pressing on of the rupture element, the rupture element, in particular the edge of the rupture element and/or the housing part, in particular the edge region of the hole of the housing part, can be heated during the pushing or pressing on, e.g. to a temperature which is range between 70° C. and 130° C., in particular in the range between 80° C. and 120° C. The heating promotes flowing of the material of the rupture platelet into undercut regions of the surface structures which are manufactured on the housing part by the laser processing.

The invention provides, in particular, the following advantages:

(1) Cost advantages arise from the method according to the invention in comparison with the welded-on aluminum rupture diaphragms mentioned in the background section.

(2) In addition, advantages arise with respect to the flexibility of the installation space. The edge of the plate-shaped rupture element can extend relatively close to one edge of the housing part even if the housing part has to be welded in its edge region to another housing part of the battery cell. Therefore, only a comparatively short minimum distance is necessary between the edge of the plate-shaped rupture element and a welding region in which the housing part is welded to another housing part of the battery cell.

(3) Another significant advantage is to be seen in the fact that the housing part (e.g. housing cover) to which the rupture element is attached can already be welded to another housing part (e.g. the housing pot) of the battery cell and the rupture element can only be applied subsequently. An electrolyte can then be filled into the housing of the battery cell via the initially still open hole in the housing part. After the filling of the electrolyte through the hole provided in the housing part, the hole can be closed off in a fluid-tight fashion by applying the rupture element, as described above.

Other objects, advantages and novel features of the present invention will become apparent from the following detailed description of one or more preferred embodiments when considered in conjunction with the accompanying drawing.

BRIEF DESCRIPTION OF THE DRAWING

The single FIG. 1 shows the basic principle of the invention in a highly schematic illustration.

DETAILED DESCRIPTION OF THE DRAWING

FIG. 1 shows a housing part 1 of a battery cell housing (not illustrated in more detail here). The housing part 1 can be, for example, a housing cover which closes off a battery cell housing (not illustrated in more detail here) from above with respect to the direction g of gravity. The housing 1 can be composed e.g. of aluminum or of an aluminum alloy.

A through-hole 1a, which extends from an outer side 1b of the housing part 1 to inner side 1c facing an interior of the battery cell (not illustrated in more detail here) is provided in the housing part 1. The through-hole 1a is provided to allow pressure or gas to escape from the interior of the battery cell into the surroundings 2 in the event of a malfunction in which an unacceptably high increase in pressure occurs in the interior of the battery cell. The through-hole can have the shape of an elongate hole, which facilitates the filling of an electrolyte fluid into the interior of the battery cell.

The through-hole 1a of the housing part 1 has an all round edge 3 which extends around the through-hole 1a. This edge 3, which forms a part of the outer side 1b of the housing part 1, is roughened. The roughening of the edge region 3 can be carried out e.g. by irradiation with a laser. As a result, surface structures, such as e.g. capillaries, pores or the like which have undercuts, can be manufactured in a targeted fashion. In particular groove-like structures can be generated in the edge region 3 by irradiation with a laser (not illustrated in more detail here). In addition, oxide-like structures of the material from which the housing part 1 is composed can be generated by irradiation with a laser. Trials have shown that in this context, in particular, mushroom-head-like oxide structures which have numerous undercuts can be formed.

After the roughening of the edge region 3 of the housing part 1, a plate-shaped rupture element 4, which can be composed of a plastic material, such as e.g. polypropylene, is applied in a fluid-tight fashion to the housing part 1.

As is apparent from FIG. 1, the plate-shaped rupture element 4 is somewhat larger than the through-hole 1a, i.e. the plate-shaped rupture element 4 covers the through-hole 1a completely. As a result of the plate-shaped rupture element 4 being pushed or pressed onto the housing part 1, material of the rupture element 4 begins to flow on an underside 4a of the rupture element 4. In this context, material of the rupture element 4 flows, in particular, into undercut regions which have been generated previously during the roughening process. This results in a very good form fit in the micrometer range or nanometer range between the rupture element 4 and the upper side 1b of the housing part 1 in the edge region 3 of the housing part 1.

The flowing of the material of the rupture element 4 can be promoted if the rupture element 4 is heated, at least in its edge region 4a and/or the housing part 1 is heated at least in its edge region 3, during the pushing or pressing on of the rupture element 4, e.g. to a temperature in the range between 70° C. and 130° C. or above a temperature in the range between 80° C. and 120° C.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for applying a rupture element to a housing part of a battery cell, the method comprising the steps of:
   making available the housing part, wherein the housing part has an inner side facing an interior of the battery cell and an outer side facing an exterior of the battery cell, and a hole in the housing part, via which hole, in the event of a malfunction in which an increase in pressure above a threshold occurs in the battery cell, pressure can escape into the surroundings,
   providing a plate-shaped rupture element which is at least larger than the hole; and
   applying the plate-shaped rupture element from the outer side onto the hole in such a way that it covers completely the hole; and
   causing the hole to have has a leakage rate that is at most $5*10^{-6}$ (mbar*1)/s by connecting an edge region of the plate-shaped rupture element all around to an edge region, extending around the hole, of the housing part in such a way that the plate-shaped rupture element closes off the hole in a fluid-tight fashion, wherein the plate-shaped rupture element has at least one material weakened portion, so that in the event of the malfunction the connection between the plate-shaped rupture element and the housing part tears at the weakened portion.

2. The method as claimed in claim 1, wherein the connection of the edge region of the plate-shaped rupture element to the edge region, extending around the hole, of the housing part is carried out without adhesive.

3. The method as claimed in claim 1, wherein the connection is carried out by mechanical adhesion.

4. The method as claimed in claim 1, wherein the plate-shaped rupture element is composed of a plastic material.

5. The method as claimed in claim 1, wherein the plate-shaped rupture element is composed of a polypropylene material.

6. The method as claimed in claim 1, wherein the housing part is composed of aluminum or of an aluminum alloy.

7. The method as claimed in claim 1, wherein a surface of the edge region extending around the hole on the outer side of the housing part is roughened before applying the rupture element.

8. The method as claimed in claim 7, wherein the roughening is carried out via laser processing.

9. The method as claimed in claim 7, wherein structures are generated in a surface of the edge region extending around the hole by the laser processing.

10. The method as claimed in claim 9, wherein the structures are groove-shaped and/or mushroom-head-shaped structures.

11. The method as claimed in claim 9, wherein the structures have dimensions which are in the micrometer range, in the sub-micrometer range or in the nanometer range.

12. The method as claimed in claim 9, wherein the structures are filled at least partially with material of the plate-shaped rupture element.

13. The method as claimed in claim 9, wherein the structures are manufactured such that undercut regions are produced in the structures, with the result that form fits are produced between the material, penetrating the undercut regions of the structures, of the rupture element and the housing part.

14. The method as claimed in claim 10, wherein the groove-shaped and/or mushroom-head-shaped structures are formed partially or predominantly from oxides of the material of the housing part, wherein the oxides arise as a result of irradiation with a laser.

15. The method as claimed in claim 1, wherein the rupture element is pushed or pressed onto the housing part, and the rupture element and/or the housing part are/is heated during pushing or pressing on.

16. The method as claimed in claim 15, wherein during pushing or pressing on, the rupture element and/or the housing part are/is heated to a temperature which is in the range between 70° C. and 130° C.

17. The method as claimed in claim 1, wherein the housing part is composed of a metal material.

18. The method as claimed in claim 1, wherein the housing part is made of a plastic material and the plate-shaped rupture element is made of a plastic material.

* * * * *